(12) United States Patent
Nishi et al.

(10) Patent No.: US 11,186,312 B2
(45) Date of Patent: Nov. 30, 2021

(54) WORK VEHICLE

(71) Applicant: KUBOTA CORPORATION, Osaka (JP)

(72) Inventors: Keishiro Nishi, Sakai (JP); Atsushi Shinkai, Sakai (JP); Tomofumi Fukunaga, Sakai (JP); Takahiro Nakatsuka, Sakai (JP)

(73) Assignee: KUBOTA CORPORATION, Osaka (JP)

(*) Notice: Subject to any disclaimer, the term of this patent is extended or adjusted under 35 U.S.C. 154(b) by 228 days.

(21) Appl. No.: 16/469,650

(22) PCT Filed: Dec. 26, 2017

(86) PCT No.: PCT/JP2017/046692
§ 371 (c)(1),
(2) Date: Jun. 14, 2019

(87) PCT Pub. No.: WO2018/135257
PCT Pub. Date: Jul. 26, 2018

(65) Prior Publication Data
US 2019/0315393 A1    Oct. 17, 2019

(30) Foreign Application Priority Data

Jan. 20, 2017 (JP) .............................. JP2017-008345

(51) Int. Cl.
*B62D 5/06* (2006.01)
*B62D 5/08* (2006.01)
(Continued)

(52) U.S. Cl.
CPC .............. *B62D 5/062* (2013.01); *B62D 5/08* (2013.01); *B62D 6/00* (2013.01); *B62D 49/06* (2013.01)

(58) Field of Classification Search
CPC . B62D 5/062; B62D 5/08; B62D 6/00; B62D 5/09; B62D 5/06; B62D 49/06
(Continued)

(56) References Cited

U.S. PATENT DOCUMENTS 9,796,406 B2 * 10/2017 Takagi ................ B62D 5/0409
2007/0193816 A1   8/2007 Hidaka
(Continued)

FOREIGN PATENT DOCUMENTS

EP    1813458    8/2007
EP    2221234    8/2010
(Continued)

OTHER PUBLICATIONS

The Extended European Search Report for corresponding EP Application No. 17892273.8-1009, dated Oct. 1, 2020.
(Continued)

*Primary Examiner* — Minnah L Seoh
*Assistant Examiner* — Felicia L. Brittman
(74) *Attorney, Agent, or Firm* — Mori & Ward, LLP

(57) ABSTRACT

A work vehicle includes a wheel supporting member 11 that is supported by a vehicle body frame 1 that includes left and right side members 80; left and right steerable wheels that are supported by the wheel supporting member 11 so as to be steerable; and a steering mechanism 25 that includes a power steering unit 24 and steers the left and right steerable wheels. The power steering unit 24 is located near the wheel supporting member 11 such that at least a portion of the power steering unit 24 is located between the left and right side members 80.

3 Claims, 13 Drawing Sheets

(51) Int. Cl.
 *B62D 6/00* (2006.01)
 *B62D 49/06* (2006.01)
(58) Field of Classification Search
 USPC ........................................................ 180/422
 See application file for complete search history.

(56) References Cited

U.S. PATENT DOCUMENTS

| | | | |
|---|---|---|---|
| 2010/0212994 A1 | 8/2010 | Nicklin et al. | |
| 2013/0240286 A1 | 9/2013 | Asada et al. | |
| 2015/0021116 A1* | 1/2015 | Young .................... | B62D 5/093 180/406 |
| 2016/0059912 A1 | 3/2016 | Fujimoto et al. | |
| 2018/0186402 A1 | 7/2018 | Irie | |

FOREIGN PATENT DOCUMENTS

| | | |
|---|---|---|
| JP | 61-122974 U | 8/1986 |
| JP | 62-150281 U1 | 9/1987 |
| JP | 1-105404 U1 | 7/1989 |
| JP | 3-276883 | 12/1991 |
| JP | 7-300075 | 11/1995 |
| JP | 10-266260 | 10/1998 |
| JP | 2000-128032 | 5/2000 |
| JP | 2002-013160 | 1/2002 |
| JP | 2003-261051 | 9/2003 |
| JP | 2013-060154 | 4/2013 |
| JP | 2015-020743 | 2/2015 |
| JP | 2016-078608 | 5/2016 |
| WO | WO 2016/208530 | 12/2016 |
| WO | WO 2018/135257 | 7/2018 |

OTHER PUBLICATIONS

Japanese Office Action for corresponding JP Application No. 2017-008345, dated May 12, 2020 (w/ English machine translation).
International Search Report for corresponding International Application No. PCT/JP2017/046692, dated Mar. 13, 2018.
Written Opinion for corresponding International Application No. PCT/JP2017/046692, dated Mar. 13, 2018.

\* cited by examiner

WORK VEHICLE

TECHNICAL FIELD

The present invention relates to a work vehicle that includes a wheel supporting member that is supported by a vehicle body frame that includes left and right side members, left and right steerable wheels that are supported by the wheel supporting member so as to be steerable, and a steering mechanism that includes a power steering unit and that steers the left and right steerable wheels.

BACKGROUND ART

As one example of a work vehicle, there is a tractor in which a noise insulation panel (a separating member) that is provided between a bonnet that is located in a front portion of the vehicle body and a cabin that is located in a rear portion of the vehicle body, and separates a prime mover chamber formed in the bonnet and a driver chamber formed in the cabin from each other, for example, and a full hydraulic power steering unit is attached to a supporting member of the noise insulation panel, with a vibration-proof member being interposed therebetween, and thus the power steering unit is located on the prime mover chamber side at a position that is close to the driver chamber (e.g. see JP 2013-60154A).

PRIOR ART DOCUMENTS

Patent Documents

Patent Document 1: JP 2013-60154A

SUMMARY OF THE INVENTION

Problem to be Solved by the Invention

With the above-described configuration, hydraulic pulsation noise from the power steering unit is less likely to reach the driver part in the cabin compared to when the power steering unit is located on the driver chamber side.

However, since the power steering unit is located close to the driver part, there is room for improvement in quietness in the driver part. Also, since the power steering unit, which is heavy, is provided at a relatively high position between the prime mover part chamber and the driver chamber formed in an upper part of the vehicle body, there is also room for improvement of the stability of the vehicle body.

That is to say, there is demand for improved quietness in the driver part and improved stability of the vehicle body.

Means for Solving Problems

As means for solving the above-described problems, a work vehicle according to the present invention includes:

a wheel supporting member that is supported by a vehicle body frame that includes left and right side members;

left and right steerable wheels that are supported by the wheel supporting member so as to be steerable; and a steering mechanism that includes a power steering unit and that steers the left and right steerable wheels, wherein the power steering unit is located near the wheel supporting member such that at least a portion of the power steering unit is located between the left and right side members.

With this means, in a work vehicle such as a tractor, the driver part is located in an upper portion of the vehicle body, and the wheel supporting member is located in a lower portion of the vehicle body. Therefore, the power steering unit is located in a lower portion of the vehicle body away from the driver part.

As a result, for example, if the power steering unit is of a hydraulic type, hydraulic pulsation noise from the power steering unit is less likely to reach the driver part. Also, if the power steering unit is an electronic type that is provided with an assist motor, motor noise from the power steering unit is less likely to reach the driver part. As a result, it is possible to improve quietness in the driver part.

Also, the power steering unit, which is heavy, is located in a lower portion of the vehicle body, and the center of gravity of the vehicle body is at a low position. As a result, it is possible to improve the stability of the vehicle body.

In addition, the left and right side members protect a portion of the power steering unit that is located between the side members. Therefore, it is possible to reduce the risk of the power steering unit coming into contact with another object, despite the power steering unit being located in a lower portion of the vehicle body.

As one means for making the present invention more preferable, the power steering unit includes a hydraulic steering cylinder that is linked to the left and right steerable wheels, and an oil pressure control unit that controls oil pressure that is applied to the steering cylinder, and the oil pressure control unit is supported by the vehicle body frame so as to be located between the left and right side members.

With this means, the oil pressure control unit that includes various valves and so on, of the power steering unit is protected by the left and right side members. Therefore, it is possible to reduce the risk of the oil pressure control unit coming into contact with another object and being damaged.

Also, the oil pressure control unit is stably supported with high strength by the vehicle body frame that has high strength. Therefore, it is possible to prevent the oil pressure control unit from vibrating due to hydraulic pulsation, without complicating the supporting structure.

As one means for making the present invention more preferable, the work vehicle further includes:

a steering wheel for manual steering; and an automatic driving electronic control system for automatically driving the vehicle body, wherein the oil pressure control unit includes a pilot type steering valve that controls the flow of oil to the steering cylinder, a manual type first pilot valve that controls the pilot flow amount for the steering valve according to the amount of operation performed to rotate the steering wheel, and an electric type second pilot valve that controls the pilot flow amount for the steering valve based on a control instruction from the electronic control system.

With this means, when an occupant manually drives the work vehicle, the occupant can steer the left and right steerable wheels using light operating force via the power steering unit by performing an operation to rotate the steering wheel. Also, when the work vehicle is automatically driven by the electronic control system for automatic driving, the power steering unit operates based on a control signal from the electronic control system, and therefore the left and right steerable wheels are automatically and appropriately steered.

That is to say, it is possible to automatically steer the left and right steerable wheels without providing a steering unit that is dedicated to automatic steering. Also, if a failure occurs in the electrical system of the power steering unit, the occupant can easily switch to manual steering and continue driving the work vehicle.

As one means for making the present invention more preferable, the work vehicle further includes:

a partition plate that is located so as to cover the oil pressure control unit from above;

a bonnet that provides a cooling air path between the bonnet and the upper surface of the partition plate; and a radiator that is coupled to a downstream end portion of the partition plate in a cooling direction, wherein an opening, above which a harness connection coupler included in the second pilot valve faces the opening, is formed in the partition plate, and a shielding member that blocks a gap formed between the opening and the coupler is attached to the partition plate.

With this means, it is possible to pass a wire harness that is connected to the coupler of the second pilot valve, above the partition plate. As a result, for example, compared to a case where the wire harness is passed below the partition plate, it is possible to avoid the risk of the wire harness being damaged due to another object such as a small stone being thrown by the steerable wheels and coming into contact with the wire harness.

In addition, despite the wire harness being passed above the partition plate, the shielding member can prevent dust thrown up by the steering wheels and so on from entering the cooling air path together with external air from the gap between the opening of the partition plate and the coupler. As a result, it is possible to prevent inconvenience, such as clogging of the radiator, from occurring due to dust entering the cooling air path from the gap between the opening of the partition plate and the coupler.

As one means for making the present invention more preferable, the work vehicle further includes:

a plurality of pipe fittings that are L-shaped and are screwed into, and are thus connected to, a plurality of connection portions that are provided in the oil pressure control unit, wherein pipe fittings that extend from the oil pressure control unit and are connected to connection ports that are adjacent to each other, of the plurality of pipe fittings, have extension lengths that are different from each other such that one of the pipe fittings that are adjacent to each other is located on the inner side of the other pipe fitting when the pipe fittings are connected to the connection ports.

With this means, when the L-shaped pipe fittings are to be respectively screwed into, and thus connected to, the connection ports of the oil pressure control unit, the pipe fittings are screwed into, and thus connected to, the connection ports corresponding thereto in ascending order of extension lengths from the oil pressure control unit. As a result, when a pipe fitting that has a long extension length from the oil pressure control unit is screwed into, and thus connected to, the connection portion corresponding thereto, pipe fittings that have been connected are prevented from being obstructions.

As a result, even if the oil pressure control unit is located in a narrow space between the left and right side members, the pipe fittings can be efficiently screwed into, and thus connected to, the connection portions of the oil pressure control unit.

BEST MODE FOR CARRYING OUT THE INVENTION

The following describes, as an example of a mode for carrying out the present invention, an embodiment in which the present invention is applied to a tractor, which is an example of a work vehicle, with reference to the drawings.

Figure 1:
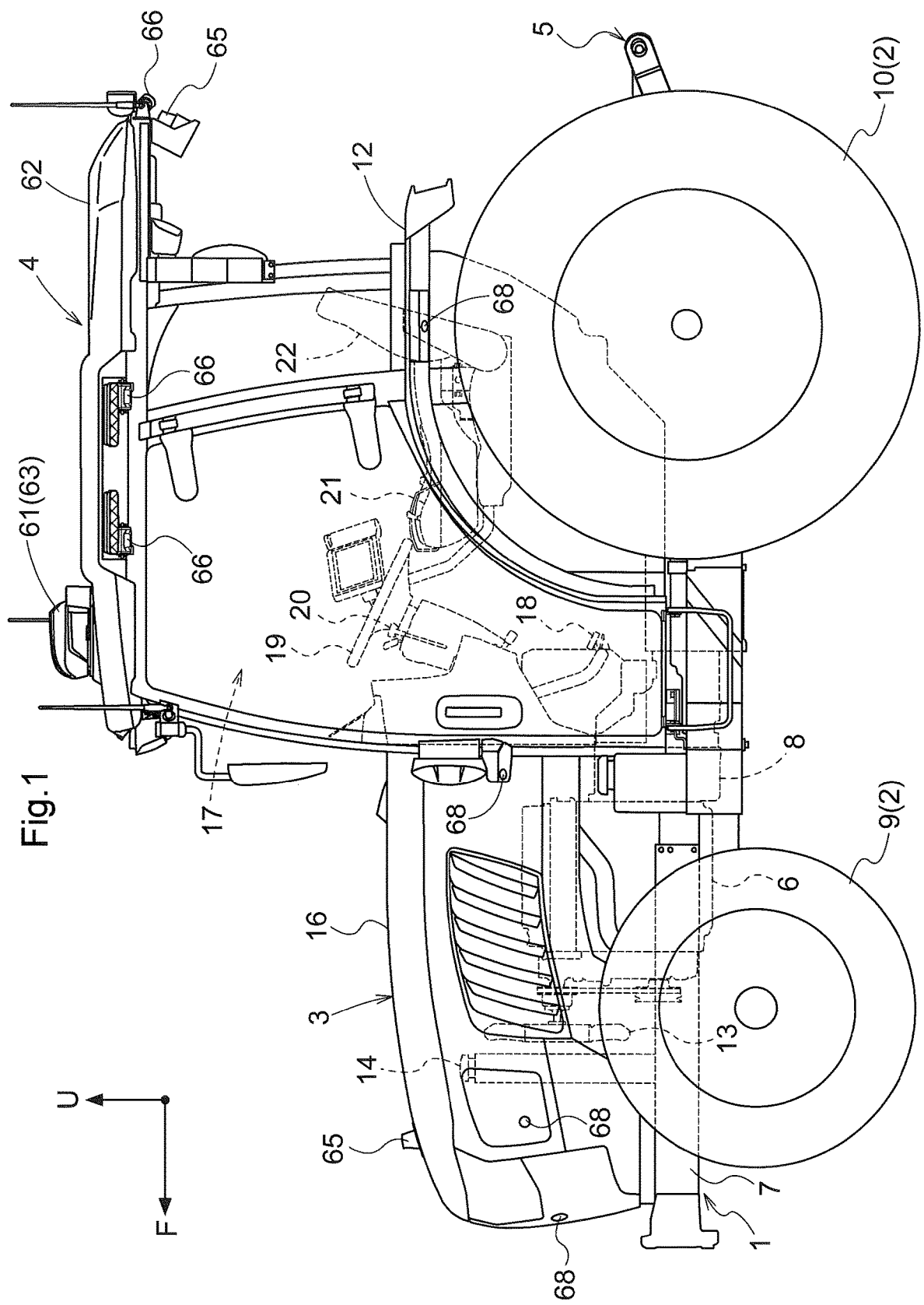
FIG. 1 is a left side view of a tractor.

Note that the arrow with a reference sign F in FIG. 1 indicates the front side of the tractor, and the arrow with a reference sign U indicates the upper side of the tractor.

Figure 2:
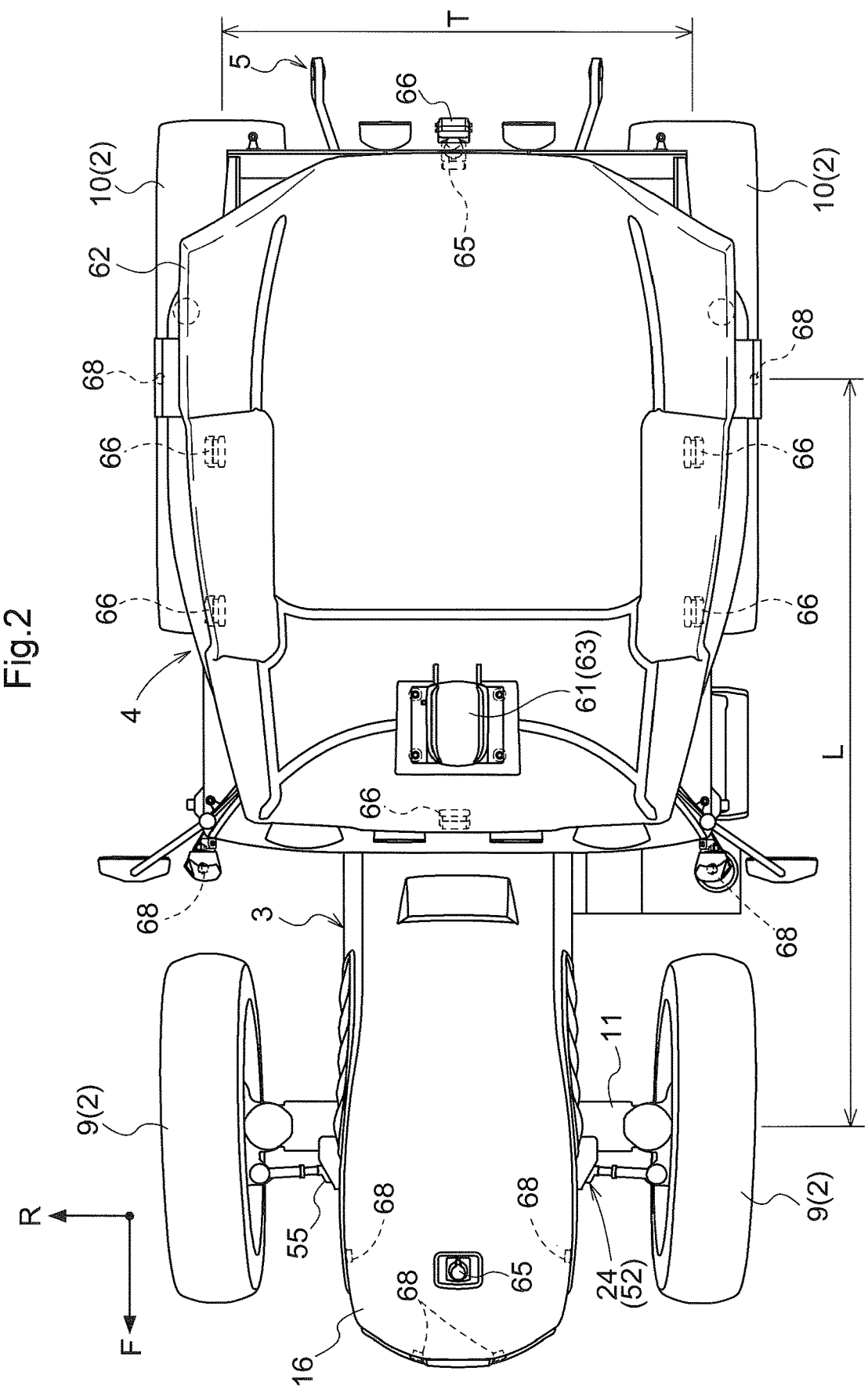
FIG. 2 is a plan view of the tractor.

The arrow with a reference sign F in FIG. 2 indicates the front side of the tractor, and the arrow with a reference sign R indicates the right side of the tractor.

Figure 3:
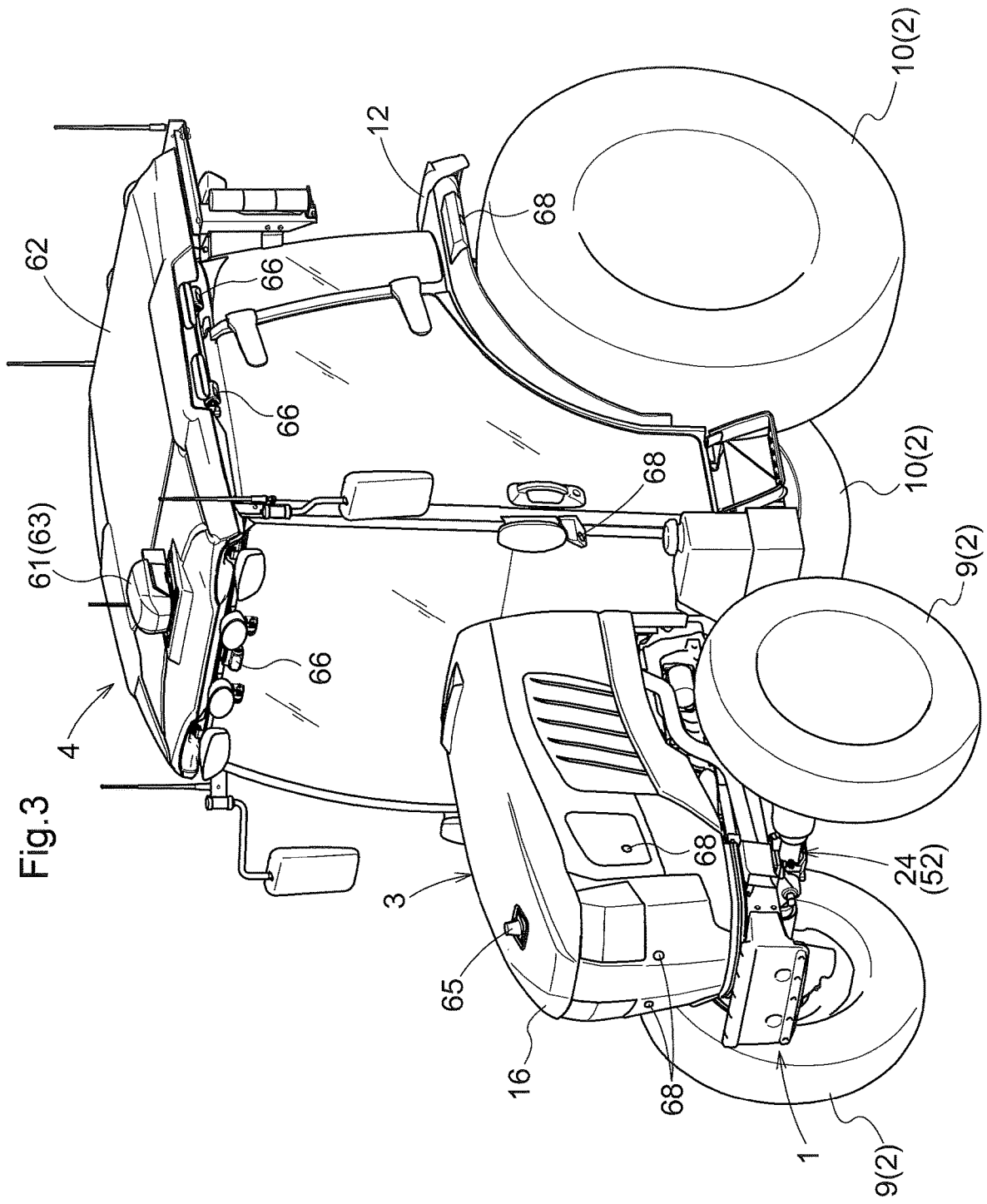
FIG. 3 is a perspective view of the tractor.

As shown in FIGS. 1 to 3, the tractor illustrated in the present embodiment include: a vehicle body frame 1 that spans between the front and rear ends of the vehicle body; travel apparatuses 2; a prime mover part 3; a cabin 4; and a three-point linkage mechanism 5 that is used to couple a work apparatus thereto. The travel apparatuses 2 are respectively provided on the left and right of the vehicle body frame 1. The prime mover part 3 is located at a front portion of the vehicle body frame 1. The cabin 4 is located at a rear portion of the vehicle body frame 1. The three-point linkage mechanism 5 is attached to a rear end portion of the vehicle body frame 1 so as to be able to be swung up and down.

As shown in FIGS. 1 to 7, the vehicle body frame 1 includes a front frame 7 and a case unit 8 that also serves as a rear frame. The front frame 7 extends from a position below an engine 6 located in the prime mover part 3 to the front side of the vehicle body. The case unit 8 extends from a position below the rear end of the engine 6 to the rear side of the vehicle body. Although not shown in the drawings, the case unit 8 houses: a pedal-operation type main clutch; a speed change power transmission unit; and a pair of left and right side brakes. The main clutch connects or disconnects power from the engine 6. The speed change power transmission unit splits power transmitted via the main clutch into travel power and work power, and performs speed change. Side brakes affect the left and right travel apparatuses 2.

The left and right travel apparatuses 2 include left and right front wheels 9 that function as drivable and steerable wheels, and left and right rear wheels 10 that function as driving wheels. The left and right front wheels 9 are supported at the left and right ends of a wheel supporting member 11 that is rotatably supported by the front frame 7, so as to be drivable in a steerable state. The wheel supporting member 11 is a front wheel shaft case that houses, for example, a power transmission shaft 11A for driving the front wheels. The left and right rear wheels 10 are drivably supported by the case unit 8, and upper portions of the rear wheels 10 are covered by left and right rear fenders 12 located in a rear portion of the vehicle body.

The prime mover part 3 includes: the engine 6 of a water-cooled type; a cooling fan 13; a radiator 14; a battery 15; an exhaust processing apparatus (not shown); an air cleaner (not shown); and a bonnet 16 that is swung open and closed. The engine 6 is located in a rear portion of the prime mover part 3 relative to the vehicle body, which is a downstream portion of the prime mover part 3 in a cooling direction. The cooling fan 13 is located in a front portion of the vehicle body, which is located upstream of the engine 6 in the cooling direction. The radiator 14 is located forward of the cooling fan 13 in the vehicle body. The battery 15 is located forward of the radiator 14 in the vehicle body. The exhaust processing apparatus is located above a rear portion of the engine 6. The air cleaner is located above a front portion of the engine 6. The bonnet 16 is configured to be swung open and closed and covers the engine 6, the radiator 14, and so on from above. An electronic control type diesel engine that is provided with a common rail system is employed as the engine 6. A DOC (Diesel Oxidation Catalyst), a DPF (Diesel Particulate Filter), and so on are provided in the exhaust processing apparatus.

As shown in FIGS. 1 to 4 and 6 to 9, the cabin 4 provides a driver part 17 and a boarding space in a rear portion of the vehicle body. The driver part 17 includes: a clutch pedal 18; left and right brake pedals 49; a steering wheel 19 for manual steering; a shuttle lever 20 for switching to forward travel and rearward travel; a driver's seat 22; and a display unit 23. The clutch pedal 18 enables operation of the main clutch. The brake pedals 49 enable operation of the left and right side brakes. The steering wheel 19 enables manual steering of the left and right front wheels 9. The driver's seat 22 has an armrest 21 for the right arm. The display unit 23 includes, for example, a liquid crystal panel 23A that accepts touch operations. The steering wheel 19 is linked to the left and right front wheels 9 via a steering mechanism 25, and the steering mechanism 25 includes a full hydraulic type power steering unit 24. The armrest 21 is provided with a main shift lever 26, an up/down lever 27 for setting the height position of the work apparatus, and an up/down switch 28 for making an instruction to move the work apparatus up and down.

Figure 10:
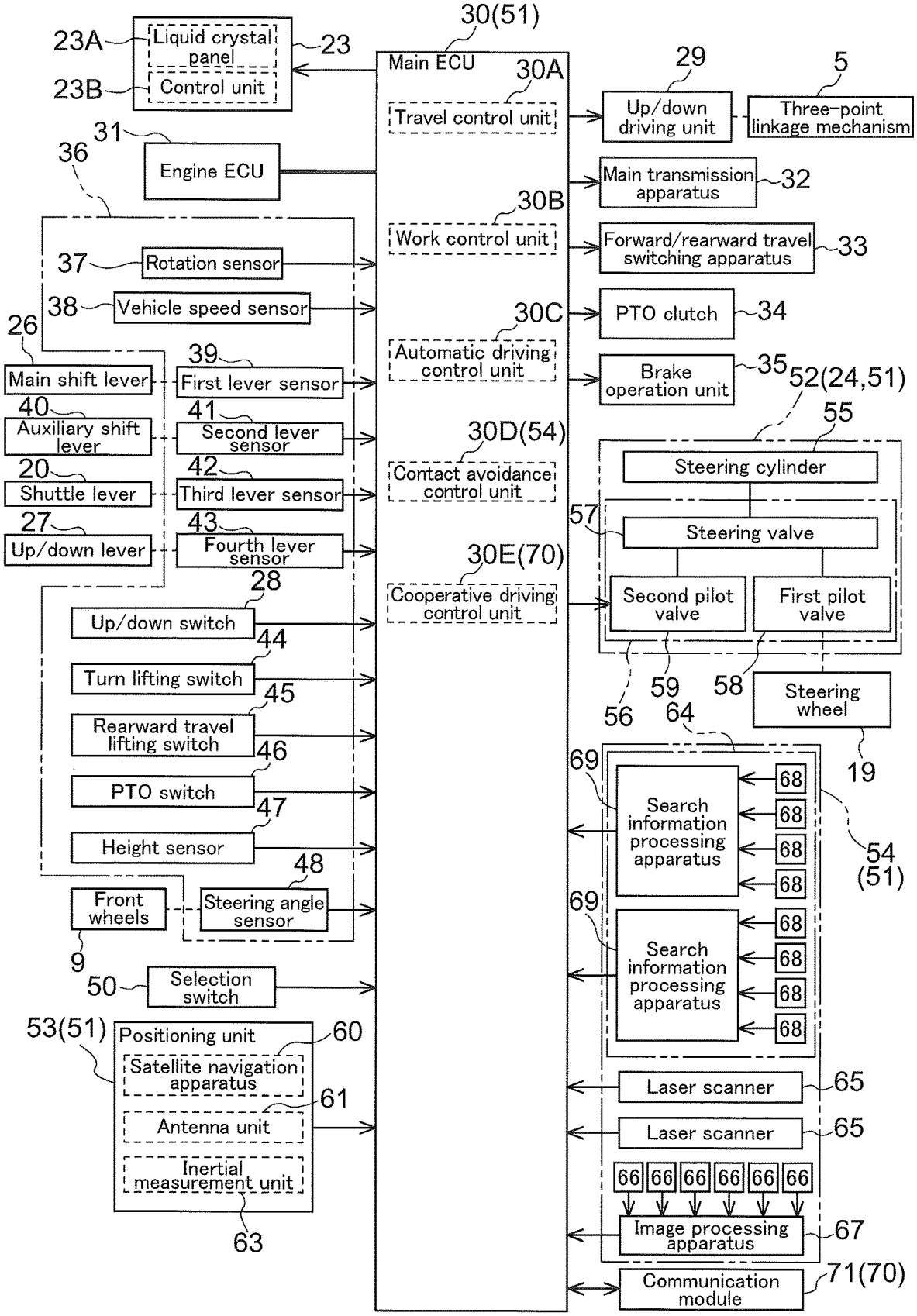
FIG. 10 is a block diagram showing an overall configuration of a control system.
Figure 11:
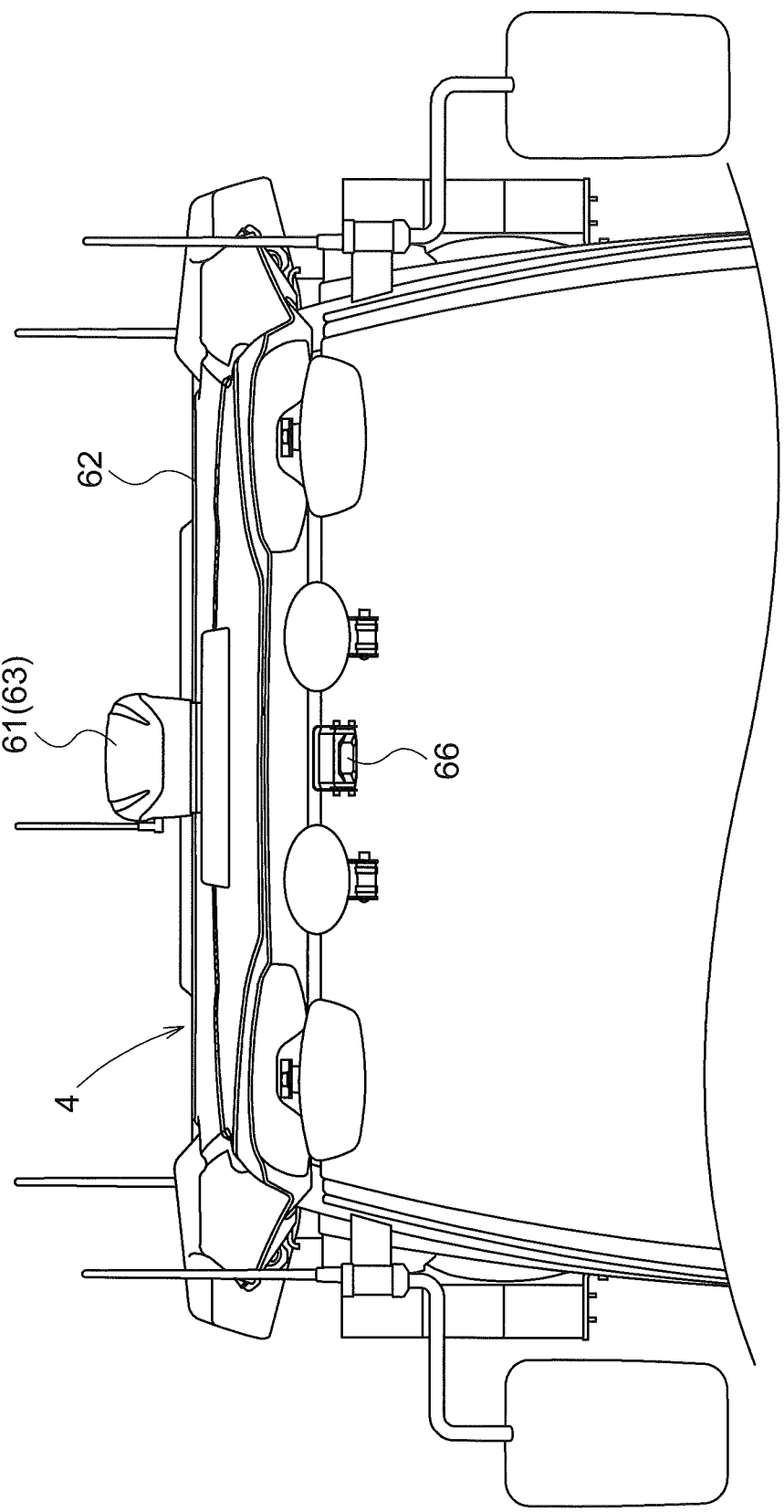
FIG. 11 is a front view of an upper portion of a cabin, showing the positions of an antenna unit and a monitor camera.
Figure 12:
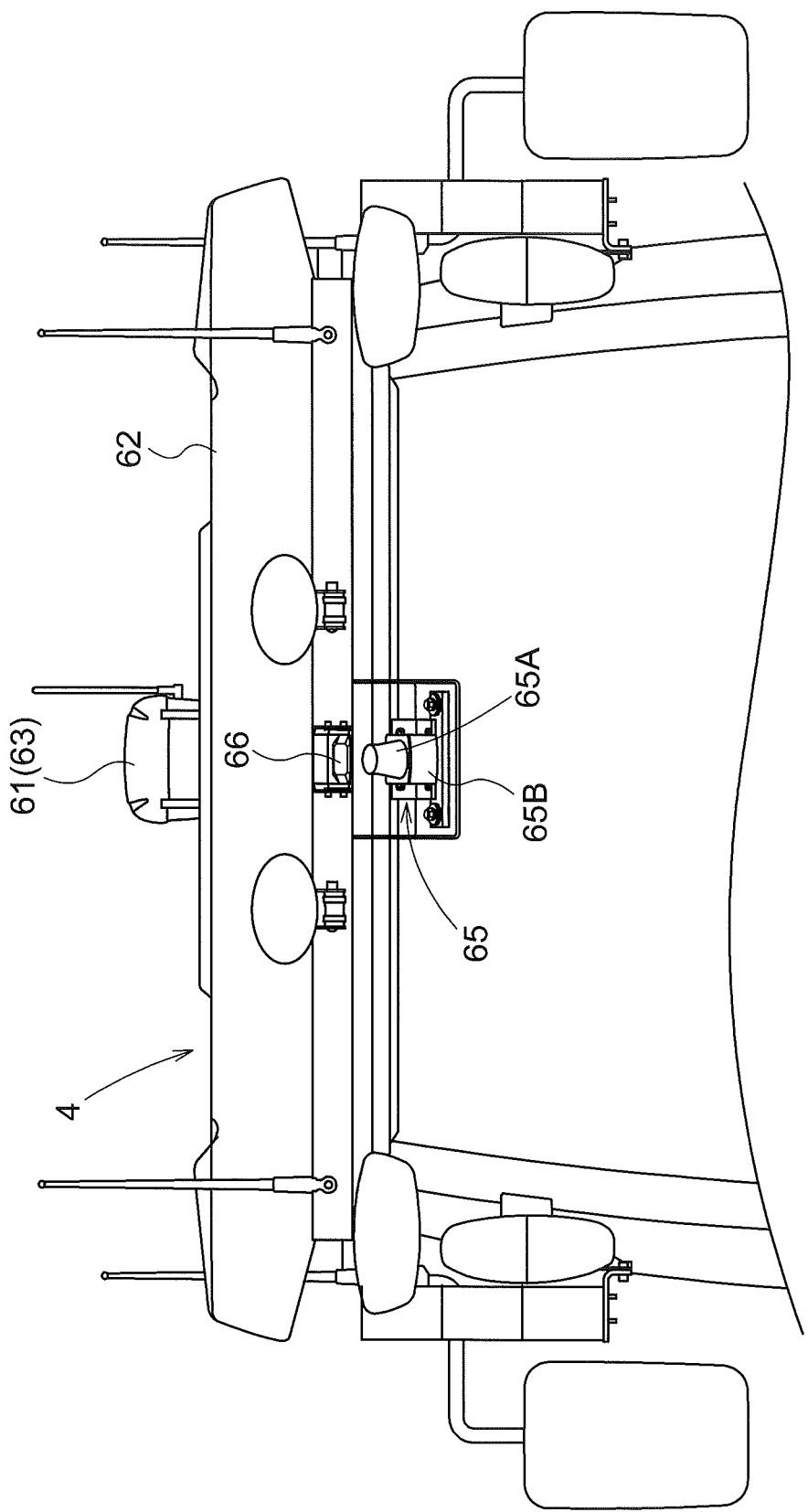
FIG. 12 is a rear view of the upper portion of the cabin, showing the positions of the antenna unit and the monitor camera.
Figure 13:
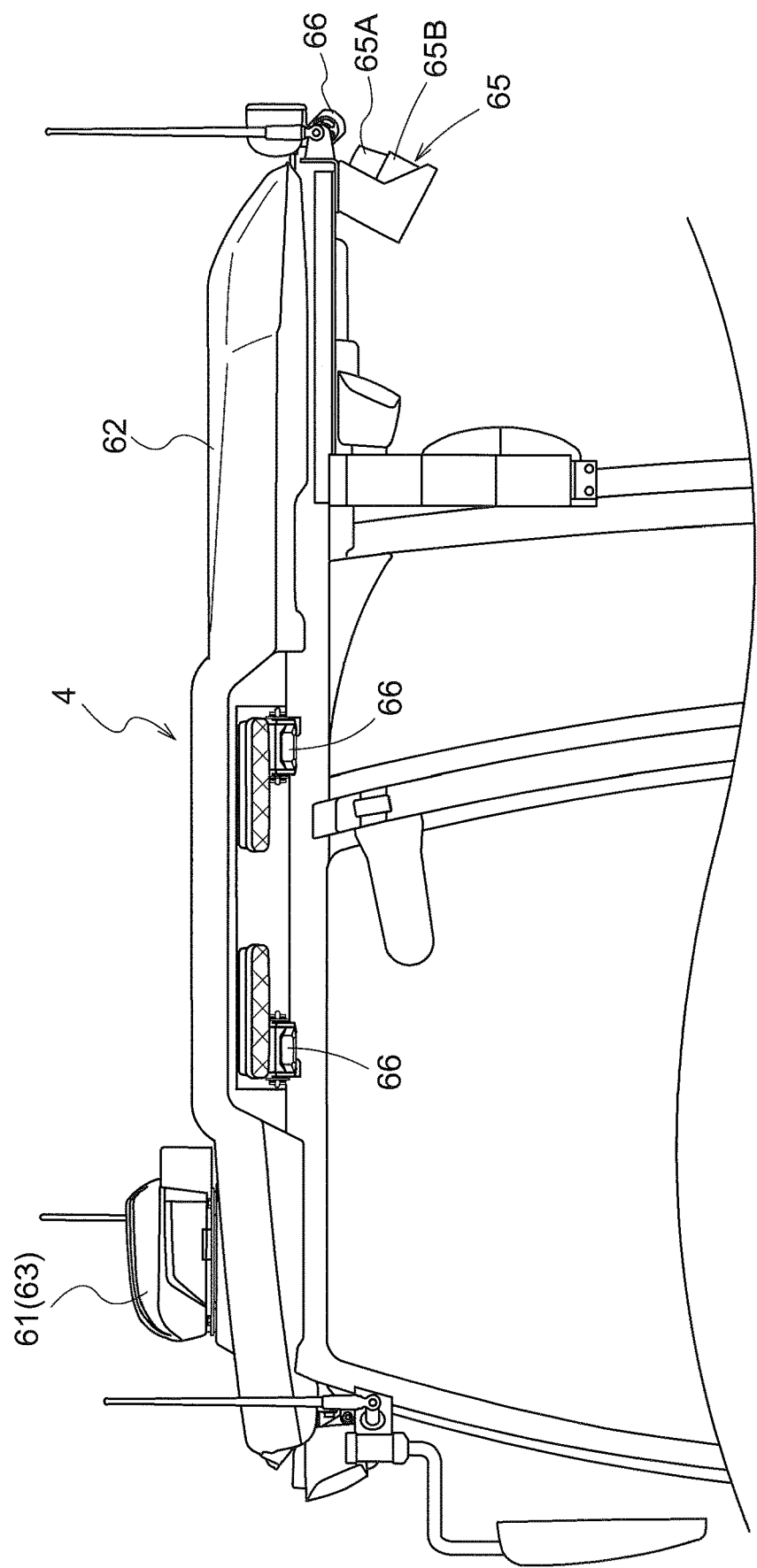
FIG. 13 is a left side view of the upper portion of the cabin, showing the positions of the antenna unit and the monitor camera.

As shown in FIG. 10, the three-point linkage mechanism 5 is driven to be swung in the top-bottom direction as a result of the action of an electronic hydraulic control type up/down driving unit 29 provided in the vehicle body. Although not shown in the drawings, a work apparatus such as a rotary cultivating apparatus, a plow, a disc harrow, a cultivator, a subsoiler, a sowing apparatus, a spraying apparatus, or the like can be coupled to the three-point linkage mechanism 5. If a work apparatus coupled to the three-point linkage mechanism 5 is a rotary cultivating apparatus or the like that is driven by power from the vehicle body, work power taken out from the shift unit is transmitted thereto via an external power transmission shaft.

A main ECU 30, which is a main electronic control unit, is mounted on the vehicle body, and the main ECU 30 includes a travel control unit 30A that performs control regarding travel of the vehicle body, and a work control unit 30B that performs control regarding the work apparatus. The main ECU 30 is connected to the above-described electronic hydraulic control type up-down driving unit 29, an engine ECU 31, which is an electronic control unit for the engine, an electronic control type main transmission apparatus 32, a forward/rearward travel switching apparatus 33, a PTO clutch 34, an electronic hydraulic type brake operation unit 35, an in-vehicle information acquisition unit 36, and so on via an in-vehicle LAN such as a CAN (Controller Area Network) or a communication line, so as to be able to communicate with them. The main transmission apparatus 32, the forward/rearward travel switching apparatus 33, and the PTO clutch 34 are each provided in the speed change power transmission unit. The brake operation unit 35 enables automatic operation of the left and right side brakes. The in-vehicle information acquisition unit 36 acquires in-vehicle information including the vehicle speed. The main ECU 30 and the engine ECU 31 include a microprocessor that includes a CPU, an EEPROM, and so on. The travel control unit 30A includes, for example, various control programs that realize control regarding the travel of the vehicle body. The work control unit 30B includes, for example, various control programs that realize control regarding the travel of the vehicle body.

A hydraulic static continuously variable transmission apparatus that performs continuous speed change on travel power is employed as the main transmission apparatus 32. The forward/rearward travel switching apparatus 33 also serves as a travel clutch that connects or disconnects travel power. Although not shown in the drawings, the speed change power transmission unit includes, in addition to the main transmission apparatus 32 and so on, an auxiliary transmission apparatus that performs stepwise speed change on travel power, a PTO transmission apparatus that performs stepwise speed change on work power, and so on.

The in-vehicle information acquisition unit 36 includes various sensors such as a rotation sensor 37, a vehicle speed sensor 38, a first lever sensor 39, a second lever sensor 41, a third lever sensor 42, and a fourth lever sensor 43. Also, the in-vehicle information acquisition unit 36 includes various switches such as the above-described up/down switch 28, a turn lifting switch 44, a rearward travel lifting switch 45, a PTO switch 46, a height sensor 47, and a steering angle sensor 48. The rotation sensor 37 detects the output speed of the engine 6. The vehicle speed sensor 38 detects the output speed of the auxiliary transmission apparatus as the vehicle speed. The first lever sensor 39 detects the operation position of the main shift lever 26. The second lever sensor 41 detects the operation position of an auxiliary shift lever 40 that is provided in the driver part 17. The third lever sensor 42 detects the operation position of the shuttle lever 20. The fourth lever sensor 43 detects the operation position of the up/down lever 27. The turn lifting switch 44, the rearward travel lifting switch 45, and the PTO switch 46 are each included in the driver part 17. The height sensor 47 detects the angle of up/down swing of left and right lift arms (not shown) of the up/down driving unit 29 as the height position of the work apparatus. The steering angle sensor 48 detects the steering angle of the front wheels 9.

The travel control unit 30A performs vehicle speed control to operate a trunnion shaft (not shown) of the main transmission apparatus 32 based on the output from the rotation sensor 37, the output from the vehicle speed sensor 38, the output from the first lever sensor 39, and the output from the second lever sensor 41 such that the vehicle speed reaches a control target vehicle speed obtained based on the engine output speed, the operation position of the main shift lever 26, and the operation position of the auxiliary shift lever 40. Thus, the driver can change the vehicle speed to any vehicle speed by operating the main shift lever 26 to a certain operation position.

The travel control unit 30A performs forward/rearward travel switching control to switch the forward/rearward travel switching apparatus 33 to a power transmission state corresponding to the operation position of the shuttle lever 20, based on the output from the third lever sensor 42. Thus, the driver can set the travel direction of the vehicle body to the forward direction by operating the shuttle lever 20 to a forward travel position. Also, the driver can set the travel direction of the vehicle body to the rearward direction by operating the shuttle lever 20 to a rearward travel position.

The work control unit 30B performs position control to control the action of the up/down driving unit 29 based on the output from the fourth lever sensor 43 and the output from the height sensor 47, such that the work apparatus is located at the height position that corresponds to the operation position of the up/down lever 27. Thus, the driver can change the height position of the work apparatus to any height position by operating the up/down lever 27 to a certain operation position.

Upon the up/down switch 28 being switched to a lifting instruction state in response to the up/down switch 28 being manually operated, the work control unit 30B performs lifting control to control the action of the up/down driving unit 29 based on a lifting instruction from the up/down switch 28 and the output from the height sensor 47 such that the work apparatus is lifted to an upper limit position that has been determined in advance. Thus, the driver can make the work apparatus be automatically lifted to the upper limit position by switching the up/down switch 28 to the lifting instruction state.

Upon the up/down switch 28 being switched to a lowering instruction state in response to the up/down switch 28 being manually operated, the work control unit 30B performs lowering control to control the action of the up/down driving unit 29 based on a lowering instruction from the up/down switch 28, the output from the fourth lever sensor 43, and the output from the height sensor 47 such that the work apparatus is lowered to a work height position that has been set using the up/down lever 27. Thus, the driver can make the work apparatus be automatically lowered to the work height position by switching the up/down switch 28 to the lowering instruction state.

When execution of turn-conjunctive lifting control is selected in response to the turn lifting switch 44 being manually operated, the work control unit 30B automatically performs the above-described lifting control upon detecting that the steering angle of the front wheels 9 has reached a set angle for a ridge edge turn based on the output from the steering angle sensor 48 that detects the steering angle of the front wheels 9. Thus, by selecting execution of turn-conjunctive lifting control in advance, the driver can make the work apparatus be automatically lifted to the upper limit position in conjunction with the start of a ridge edge turn.

When execution of rearward travel-conjunctive lifting control is selected in response to the rearward travel lifting switch 45 being manually operated, the work control unit 30B automatically performs the above-described lifting control upon detecting that the shuttle lever 20 has been manually operated to the rearward travel position based on the output from the third lever sensor 42. Thus, by selecting execution of rearward travel-conjunctive lifting control in advance, the driver can make the work apparatus be automatically lifted to the upper limit position in conjunction with switching to rearward travel.

Upon the PTO switch 46 being manually operated and switched to an ON position, the work control unit 30B performs clutch ON control to switch the PTO clutch 34 to an ON position based on the switching of the PTO switch 46 to the ON position so that work power is transmitted to the work apparatus. Thus, the driver can activate the work apparatus by operating the PTO switch 46 to the ON position.

Upon the PTO switch 46 being manually operated and switched to an OFF position, the work control unit 30B performs clutch OFF control to switch the PTO clutch 34 to an OFF position based on the switching of the PTO switch 46 to the OFF position so that work power is not transmitted to the work apparatus. Thus, the driver can stop the work apparatus by operating the PTO switch 46 to the OFF position.

Upon the PTO switch 46 being manually operated and switched to an automatic position, the work control unit 30B automatically performs the above-described clutch OFF control in conjunction with execution of the above-described lifting control, or automatically performs the above-described clutch ON control in conjunction with execution of the above-described lowering control. Thus, by operating the PTO switch 46 to the automatic position in advance, the driver can stop the work apparatus in conjunction with the automatic lifting of the work apparatus to the upper limit position, or activate the work apparatus in conjunction with the automatic lowering of the work apparatus to the work height position.

As shown in FIGS. 1 to 8 and 10, a selection switch 50 and an electronic control system 51 for are provided in the tractor. The selection switch 50 enables the driver to select a manual driving mode, an automatic driving mode, or the like as a driving mode. The electronic control system 51 automatically drives the vehicle body when the automatic driving mode is selected. The electronic control system 51 includes the above-described main ECU 30, an automatic steering unit 52, a positioning unit 53, a monitoring unit 54, and so on. The automatic steering unit 52 realizes automatic steering of the left and right front wheels 9. The positioning unit 53 measures the position and orientation of the vehicle body. The monitoring unit 54 monitors the surroundings of the vehicle body.

As shown in FIGS. 2 to 4, 6 to 8, and 10, the automatic steering unit 52 is constituted by the above-described power steering unit 24. The power steering unit 24 includes a hydraulic double-acting steering cylinder 55 and an oil pressure control unit 56. The steering cylinder 55 is linked to the left and right front wheels 9. The oil pressure control unit 56 controls oil pressure that is applied to the steering cylinder 55. The oil pressure control unit 56 includes a pilot type steering valve 57, a manual type first pilot valve 58, and an electric type second pilot valve 59. The steering valve 57 controls the flow of oil to the steering cylinder 55. The manual type first pilot valve 58 controls the pilot flow amount for the steering valve 57 according to the amount of operation performed to rotate the steering wheel 19. The electric type second pilot valve 59 controls the pilot flow amount for the steering valve 57 based on a control instruction from the main ECU 30.

With the above-described configuration, when the manual driving mode is selected, the occupant can steer the left and right front wheels 9 using light operating force via the power steering unit 24 by performing an operation to rotate the steering wheel 19. When the automatic driving mode is selected, the power steering unit 24 operates based on a control instruction from the main ECU 30, and the left and right front wheels 9 are automatically steered in an appropriate manner.

That is to say, it is possible to automatically steer the left and right front wheels 9 without providing a steering unit that is dedicated to automatic steering. Also, if a failure occurs in the electrical system of the power steering unit 24, the occupant can easily switch to manual steering and continue driving the vehicle body.

As shown in FIGS. 1 to 3 and 10 to 13, the positioning unit 53 includes a satellite navigation apparatus 60 that measures the position and orientation of the vehicle body using a well-known GPS (Global Positioning System), which is an example of a GNSS (Global Navigation Satellite System). Positioning methods using a GPS include a DGPS (Differential GPS) method and an RTK-GPS (Real Time Kinematic GPS) method, for example. In the present embodiment, an RTK-GPS (Real Time Kinematic GPS) method, which is suitable for positioning a moving object, is employed.

The satellite navigation apparatus 60 includes a satellite navigation antenna unit 61 that receives radio waves transmitted from a GPS satellite (not shown) and positioning data transmitted from a reference station (not shown) located at a known position. The reference station transmits positioning data obtained by receiving radio waves from the GPS satellite, to the satellite navigation apparatus 60. The satellite navigation apparatus 60 obtains the position and orientation of the vehicle body based on positioning data obtained by receiving radio waves from the GPS satellite, and positioning data from the reference station.

The antenna unit 61 is attached to a roof 62 of the cabin 4, which is located at the top of the vehicle body so as to increase sensitivity when receiving radio waves from a GPS satellite. Therefore, the position and the orientation of the vehicle body measured using the GPS include positioning errors due to displacement of the antenna unit 61 resulting from yawing, pitching, or rolling of the vehicle body.

Therefore, the vehicle body is provided with an IMU 63 (Inertial Measurement Unit) that includes a three-axis gyroscope (not shown) and a three-direction acceleration sensor (not shown), and measures the yaw angle, pitch angle, roll angle of the vehicle body, and so on so that correction can be performed to remove the above-described positioning errors. The IMU 63 is provided inside the antenna unit 61 so that the amount of displacement of the above-described antenna unit 61 can be easily obtained. The antenna unit 61 is attached to a midpoint, in the left-right direction, of the upper surface of a front portion of the roof 62 of the cabin 4 such that the antenna unit 61 is located at a midpoint of a track T and a midpoint of a wheelbase L of the vehicle body in plan view (see FIG. 2).

With the above-described configuration, at least in plan view, the position at which the IMU 63 is attached is close to the position of the center of gravity of the vehicle body. As a result, it is possible to easily perform calculation for correcting the yaw angle and so on measured by the IMU 63, based on the amount of displacement of the IMU 63 from the position of the center of gravity of the vehicle body, and thus it is possible to swiftly and correctly correct the result of measurement performed by the IMU 63. That is to say, the IMU 63 can swiftly and accurately measure the yaw angle and so on of the vehicle body.

When the satellite navigation apparatus 60 measures the position and orientation of the vehicle body, if the antenna unit 61 is displaced due to yawing, pitching, or rolling of the vehicle body, it is possible to swiftly and accurately obtain the amount of displacement of the antenna unit 61 in such a case, based on, for example, the yaw angle, pitch angle, and roll angle of the vehicle body measured by the IMU 63. Then, it is possible to swiftly and accurately obtain positioning errors resulting from displacement of the antenna unit 61, based on the amount of displacement of the antenna unit 61 that can be obtained from the result of measurement performed by the IMU 63, even if the errors are included in the position and orientation of the vehicle body measured by the satellite navigation apparatus 60. Thus, it is possible to swiftly and appropriately perform correction to remove the positioning errors from the result of measurement performed by the satellite navigation apparatus 60.

As a result, it is possible to easily, swiftly, and accurately measure the position and orientation of the vehicle body using GNSS.

As shown in FIG. 10, the main ECU 30 includes an automatic driving control unit 30C that includes various control programs that realize automatic driving of the vehicle body. The automatic driving control unit 30C transmits various control instructions to the travel control unit 30A, the work control unit 30B, and so on at appropriate points in time so that the vehicle body automatically travels along a preset target travel path on a farm field at a set speed while appropriately performing work, based on, for example, the target travel path and the result of positioning performed by the positioning unit 53. The travel control unit 30A controls the operations of the main transmission apparatus 32, the forward/rearward travel switching apparatus 33, and so on by transmitting various control instructions to the main transmission apparatus 32, the forward/rearward travel switching apparatus 33, and so on at appropriate points in time, based on various control instructions from the automatic driving control unit 30C, various pieces of information acquired by the in-vehicle information acquisition unit 36, and so on. The work control unit 30B controls the operations of the up/down driving unit 29, the PTO clutch 34, and so on by transmitting various control instructions to the up/down driving unit 29, the PTO clutch 34, and so on at appropriate points in time, based on various control instructions from the automatic driving control unit 30C, various pieces of information acquired by the in-vehicle information acquisition unit 36, and so on.

The target travel path may be a travel path along which the vehicle travelled during task travel while being manually driven in a farm field, the start point of a ridge edge turn, and so on that have been converted into data based on, for example, the result of positioning performed by the positioning unit 53. Alternatively, the target travel path may be a travel path along which the vehicle travelled during teaching travel realized by manual driving in a farm field, the start point of a ridge edge turn, and so on that have been converted into data based on, for example, the result of positioning performed by the positioning unit 53.

As shown in FIGS. 1 to 5 and 10 to 13, the monitoring unit 54 includes an obstacle detection module 64, laser scanners 65 that serve as obstacle searchers, a contact avoidance control unit 30D, six monitoring cameras 66, and an image processing apparatus 67. The obstacle detection module 64 detects the presence or absence of an obstacle within an immediate range (e.g. within 1 m) of the vehicle body. The laser scanners 65 are provided at front and rear positions of the vehicle body, and detect an approaching obstacle within a short range (e.g. within 10 m) of the vehicle body, within a detection angle of approximately 270 degrees. The contact avoidance control unit 30D performs contact avoidance control to avoid coming into contact with an obstacle. The monitoring cameras 66 capture the surroundings of the vehicle body, and the image processing apparatus 67 processes images captured by the monitoring cameras 66.

The obstacle detection module 64 includes eight sonar devices 68 that serve as obstacle searchers, and two search information processing apparatuses 69. Each sonar device 68, which is an example of a range sensor, uses ultrasonic waves to measure a distance, and searches for an obstacle within the immediate range of the vehicle body. Each search information processing apparatus 69 performs determination processing to determine whether or not an obstacle has approached and entered the immediate range of the vehicle body based on search information from the sonar devices 68 corresponding thereto.

Eight sonar devices 68 are distributed on the front end portion and the left and right end portions such that the front side and the left and right sides of the vehicle body are search-target areas. Each sonar device 68 transmits search information obtained by performing a search to the search information processing apparatus 69 corresponding thereto.

Each search information processing apparatus 69 performs determination processing to determine whether or not an obstacle has approached and entered the immediate range of the vehicle body based on the period from transmission to reception of an ultrasonic wave transmitted by the sonar device 68 corresponding to the search information processing apparatus 69, and outputs the result of determination to the contact avoidance control unit 30D.

As a result, when an obstacle has approached and entered the immediate range of the vehicle body from the front side or the left or right sides of the vehicle body during automatic driving, the obstacle detection module 64 detects the approaching obstacle. Also, a sonar device 68 is not provided at a rear end portion of the vehicle body, and therefore the obstacle detection module 64 is prevented from misdetecting the work apparatus attached to the rear end of the vehicle body so as to be able to move up and down, as an obstacle.

When the vehicle body is travelling toward a ridge during automatic driving, or when the vehicle body is travelling along a ridge at a ridge edge, if the ridge has unexpectedly entered the immediate range, the obstacle detection module 64 detects the ridge as an obstacle. Also, when a moving object has unexpectedly approached and entered the immediate range, the obstacle detection module 64 detects the moving object as an obstacle.

Each laser scanner 65 includes a search unit 65A that searches for an obstacle and a processing unit 65B that processes search information from the search unit 65A. The search unit 65A irradiates a search-target area with a laser beam and receives the reflected light. The processing unit 65B determines whether or not an obstacle has approached and entered a short range of the vehicle body, for example, based on the period from irradiation to reception of the laser beam, and outputs the result of determination to the contact avoidance control unit 30D. The search-target area of the laser scanner 65 on the front side is set to be an area that is forward of the vehicle body. The search-target area of the laser scanner 65 on the rear side is set to be an area that is rearward of the vehicle body.

The contact avoidance control unit 30D includes, for example, a control program that realizes execution of contact avoidance control, and is provided in the main ECU 30.

Upon detecting that an obstacle has approached and entered the short range of the vehicle body based on the result of determination performed by each laser scanner 65, the contact avoidance control unit 30D preferentially performs contact avoidance control compared to automatic driving that is based on control operations performed by the automatic driving control unit 30C. Thereafter, the contact avoidance control unit 30D performs contact avoidance control based on the result of determination performed by each laser scanner 65 and each search information processing apparatus 69.

In contact avoidance control, the contact avoidance control unit 30D outputs a deceleration instruction to the travel control unit 30A upon contact avoidance control starting. Thus, the contact avoidance control unit 30D causes the main transmission apparatus 32 to perform a deceleration operation through a control operation performed by the travel control unit 30A, thereby reducing the vehicle speed from a set speed for normal travel to a set speed for contact avoidance. In this low-speed travel state, if the contact avoidance control unit 30D confirms that an obstacle has approached and entered the immediate range of the vehicle body based on the result of determination by any of the search information processing apparatuses 69, the contact avoidance control unit 30D outputs an emergency stop instruction to the travel control unit 30A and the work control unit 30B. As a result, the contact avoidance control unit 30D switches the forward/rearward travel switching apparatus 33 to the neutral state through a control operation performed by the travel control unit 30A, while causing the brake operation unit 35 to activate the left and right brakes to brake the left and right front wheels 9 and the left and right rear wheels 10. Also, the contact avoidance control unit 30D causes the work control unit 30B to switch the PTO clutch 34 to an OFF state to stop the action of the work apparatus. As a result, it is possible to swiftly stop the vehicle body from travelling and stop the work apparatus from operating, based on the fact that an obstacle has approached and entered the immediate range of the vehicle body, and it is possible to avoid the risk of an obstacle coming into contact with the vehicle body. In this low-speed travel state, upon confirming that there is no obstacle within the short range of the vehicle body based on the result of determination by each laser scanner 65, the contact avoidance control unit 30D outputs an acceleration instruction to the travel control unit 30A, and thereafter ends contact avoidance control. Thus, the contact avoidance control unit 30D causes the main transmission apparatus 32 to perform an acceleration operation through a control operation performed by the travel control unit 30A so that the vehicle speed is increased from the set speed for contact avoidance to the preset speed for normal travel, and thereafter restarts automatic driving that is based on a control operation performed by the automatic driving control unit 30C.

As shown in FIGS. 1 to 3 and 10 to 13, a wide-angle CCD camera for visible light is employed as each monitoring camera 66. One of the six monitoring cameras 66 is for capturing an image of objects on the front side of the vehicle body. This monitoring camera 66 is provided on the front end of the upper end portion of the cabin 4 at a central position in the left-right direction, in an inclined orientation so as to capture an image forward and downward thereof. Two of the monitoring cameras 66 are for capturing an image of objects located to the right of the vehicle body. These monitoring cameras 66 are provided at the right end of the upper end portion of the cabin 4 with a predetermined interval in the front-rear direction, in an inclined orientation so as to capture an image downward and to the right thereof. Two of the monitoring cameras 66 are for capturing an image of objects located to the left of the vehicle body. These monitoring cameras 66 are provided at the left end of the upper end portion of the cabin 4 with a predetermined interval in the front-rear direction, in an inclined orientation so as to capture an image downward and to the left thereof. One of the six monitoring cameras 66 is for capturing an image of objects on the rear side of the vehicle body. This monitoring camera 66 is provided on the rear end of the upper end portion of the cabin 4 at a central position in the left-right direction, in an inclined orientation so as to capture an image rearward and downward thereof. As a result, it is possible to capture images of the entire surroundings of the vehicle body.

Note that only one right-side monitoring camera 66 and only one left-side monitoring camera 66 may be provided at appropriate positions on the left and right end of the upper end portion of the cabin 4.

The image processing apparatus 67 processes video signals from the monitoring cameras 66, generates an image of objects on the front side of the vehicle body, an image of objects located to the right of the vehicle body, an image of objects located to the left of the vehicle body, an image of objects on the rear side of the vehicle body, a bird's eye image seen from right above the vehicle body, and so on, and transmits the images to the display unit 23 and so on. The display unit 23 includes, for example, a control unit 23B that changes an image displayed on the liquid crystal panel 23A, based on, for example, a manual operation made with various operation switches (not shown) displayed on the liquid crystal panel 23A.

With the above-described configuration, during manual driving, displaying images from the image processing apparatus 67 on the liquid crystal panel 23A makes it is easier for the driver to visually check the state of the surroundings of the vehicle body and the state of work. Thus, the driver can easily drive the vehicle body in a preferable manner according to the type of work, and so on. Also, during automatic driving, when an administrator rides in the vehicle body, displaying images from the image processing apparatus 67 on the liquid crystal panel 23A makes it easier for the administrator to visually check the state of the surroundings of the vehicle body and the state of work. If the administrator visually recognizes an abnormality in the surroundings of the vehicle body, the state of work, or the like during automatic driving, the administrator can swiftly and appropriately address the abnormality according to the type of abnormality, the degree of the abnormality, and so on.

As shown in FIG. 10, the electronic control system 51 includes the cooperation control unit 70. When a cooperative driving mode is selected by manually operating the selection switch 50, the cooperation control unit 70 causes the vehicle body to automatically drive in cooperation with another vehicle that has the same specifications. The cooperation control unit 70 includes a communication module 71 that wirelessly communicates with another vehicle to exchange information regarding cooperative travel with the other vehicle, including information regarding the positions of the vehicle bodies, with each other, and a cooperative driving control unit 30E that performs cooperative driving control based on information from the other vehicle. The cooperative driving control unit 30E includes, for example, a control program that realizes execution of cooperative driving control, and is provided in the main ECU 30.

In the cooperative driving mode, the automatic driving control unit 30C transmits various control instructions to the travel control unit 30A, the work control unit 30B, and so on at appropriate points in time so that the vehicle body automatically travels along a preset target travel path for side-by-side travel at a set speed while appropriately performing work, based on, for example, the target travel path for side-by-side travel and the result of positioning performed by the positioning unit 53. The cooperative driving control unit 30E determines whether or not the distance between the vehicle and another preceding vehicle in the forward travel direction, the distance between the vehicle and the other preceding vehicle in the side-by-side direction, and so on are appropriate, based on the target travel path for side-by-side travel of the vehicle, the result of positioning performed by the positioning unit 53, the target travel path for side-by-side travel of the other vehicle, position information regarding the other vehicle, and so on. If any of the distances between the vehicles is inappropriate, the cooperative driving control unit 30E preferentially starts cooperative driving control compared to automatic driving that is based on the control operation made by the automatic driving control unit 30C, so that the distance between the vehicles is appropriate.

In cooperative driving control, if the distance between the vehicles in the forward travel direction is shorter than an appropriate distance, the cooperative driving control unit 30E outputs a deceleration instruction to the travel control unit 30A. Thus, the cooperative driving control unit 30E causes the main transmission apparatus 32 to perform a deceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automatic driving that is based on a control operation performed by the automatic driving control unit 30C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 30E outputs an acceleration instruction to the travel control unit 30A. Thus, the cooperative driving control unit 30E causes the main transmission apparatus 32 to perform an acceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automatic driving that is based on a control operation performed by the automatic driving control unit 30C, thereby decreasing the vehicle speed to the set speed for normal travel and keeping the distance between the vehicles in the forward travel direction at the appropriate distance.

If the distance between the vehicles in the side-by-side direction is longer than the appropriate distance, the cooperative driving control unit 30E outputs a steering instruction to the travel control unit 30A to travel toward the other vehicle. Thus, the cooperative driving control unit 30E causes the left and right front wheels 9 to steer toward the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automatic driving control unit 30C, thereby returning the travel direction of the vehicle body to the travel direction for normal travel and keeping the distance between the vehicles in the side-by-side direction at the appropriate distance.

If the distance between the vehicles in the side-by-side direction is shorter than the appropriate distance, the cooperative driving control unit 30E outputs a steering instruction to the travel control unit 30A to travel away from the other vehicle. Thus, the cooperative driving control unit 30E causes the left and right front wheels 9 to steer away from the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automatic driving control unit 30C, thereby returning the travel direction of the vehicle body to the travel direction for normal travel and keeping the distance between the vehicles in the side-by-side direction at the appropriate distance.

Thus, it is possible to automatically and appropriately drive the vehicle so as to perform side-by-side travel with another preceding vehicle while keeping the distance between the vehicles in the forward travel direction or the distance between the vehicles in the side-by-side direction at an appropriate distance.

As shown in FIGS. 4 to 8, the front frame 7 includes left and right side members 80 that are made from steel plates and are elongated in the front-rear direction, and a front end member 81 and front and rear cross members 82, which are made from steel plates and span between the left and right side members 80. A bracket 83 that enables rolling of the wheel supporting member 11 is attached to the front and rear cross members 82.

The steering mechanism 25 includes, for example: a conjunction unit 84 that transmits the amount of rotational operation of the steering wheel 19 to the first pilot valve 58 of the power steering unit 24; and left and right steering knuckles 85 that convert the slide motion of a piston rod 55A of the steering cylinder 55 in a left-right direction into swing in the left-right direction, and transmit it to the left and right front wheels 9.

The power steering unit 24 is located near the wheel supporting member 11 such that the oil pressure control unit 56, which is included in the power steering unit 24, is located between the left and right side members 80. A coupling portion (not shown) of the oil pressure control unit 56 is coupled to the side member 80 on the right side, using a bolt, and thus the oil pressure control unit 56 is supported by the front frame 7.

With the above-described configuration, the power steering unit 24 is located in a lower portion of the vehicle body away from the driver part 17. As a result, hydraulic pulsation noise from the power steering unit 24 is less likely to reach the driver part 17. Thus, it is possible to improve quietness in the driver part 17.

Also, the power steering unit 24, which is heavy, is located in a lower portion of a front portion of the vehicle body. Thus, the center of gravity of the vehicle body is at a low position, and the balance of the vehicle body in the front-rear direction when the work apparatus is attached to a rear position of the vehicle body can be improved. As a result, it is possible to improve the stability of the vehicle body.

Also, the left and right side members 80, the cross members 82, and so on of the front frame 7 protect the oil pressure control unit 56 that includes the plurality of valves 57 to 59. Therefore, it is possible to reduce the risk of the oil pressure control unit 56 coining into contact with another object, despite the power steering unit 24 being located in a lower portion of the vehicle body.

In addition, the oil pressure control unit 56 is stably supported with high strength by the front frame 7 that has high strength. Therefore, it is possible to prevent the oil pressure control unit 56 from vibrating due to hydraulic pulsation, without complicating the supporting structure.

As shown in FIGS. 4 to 8, the front frame 7 includes a partition plate 86 that is made from a steel plate. The partition plate 86 is provided so as to span between the left and right side members 80 at a position where the partition plate 86 covers the oil pressure control unit 56 from above. The battery 15 and so on are provided in a cooling air path that is formed between the upper surface of the partition plate 86 and the bonnet 16. The radiator 14 is coupled to a downstream end portion of the partition plate 86 in a cooling direction.

An opening 86A, above which a harness connection coupler 59A included in the second pilot valve 59 of the power steering unit 24 faces the opening 86A, is formed in the partition plate 86, and a shielding member 87 that is made from a rubber sheet and blocks a gap formed between the opening 86A and the coupler 59A is attached to the partition plate 86.

With the above-described configuration, it is possible to pass a wire harness 88 that is to be connected to the coupler 59A of the second pilot valve 59, above the partition plate 86. As a result, for example, compared to a case where the wire harness 88 is passed below the partition plate 86, it is possible to avoid the risk of the wire harness 88 being damaged due to other objects such as a small stone being thrown by the left and right front wheels 9 and coming into contact with the wire harness 88.

In addition, despite the wire harness 88 being passed above the partition plate 86, the shielding member 87 can prevent dust thrown up by the left and right front wheels 9 and so on from entering the cooling air path together with external air from the gap between the opening 86A of the partition plate 86 and the coupler 59A. As a result, it is possible to prevent inconvenience, such as clogging of the radiator 14, from occurring due to dust entering the cooling air path from the gap between the opening 86A of the partition plate 86 and the coupler 59A.

Figure 4:
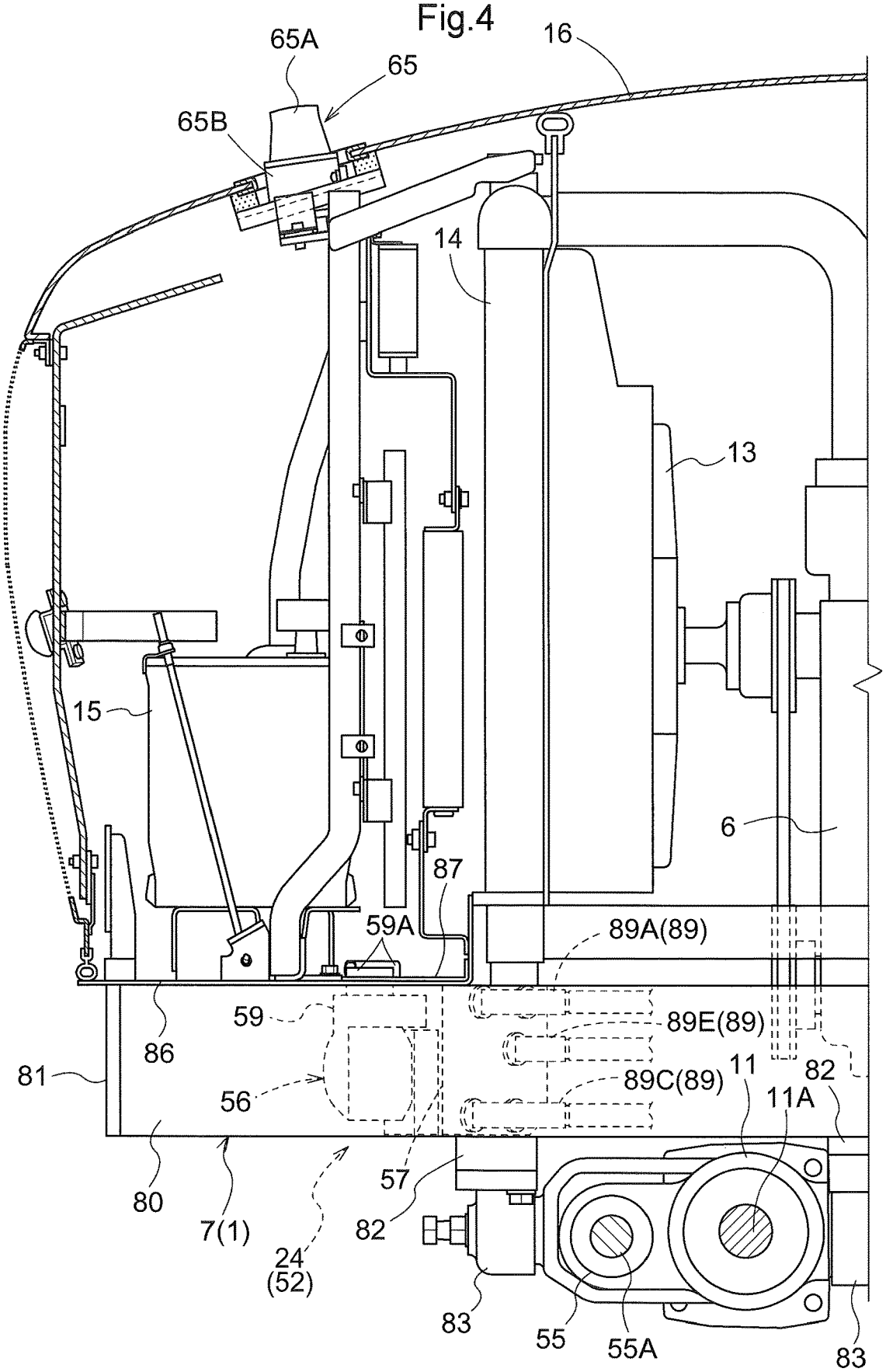
FIG. 4 is a vertical cross-sectional left side view of a front end portion of the tractor, showing the configuration and position of a power steering unit.
Figure 5:
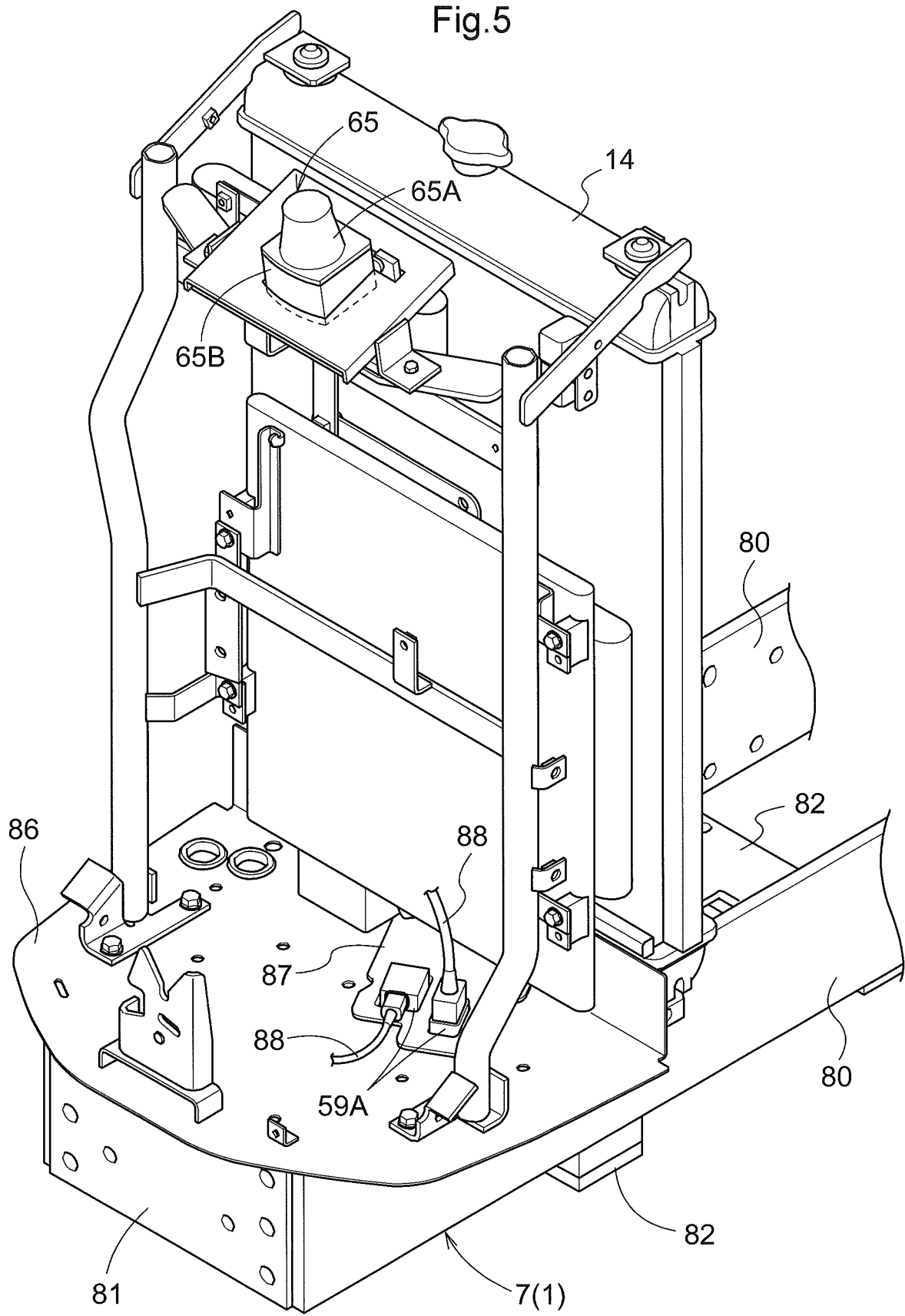
FIG. 5 is a perspective view showing a dust-proof structure of the front end portion of the tractor.
Figure 6:
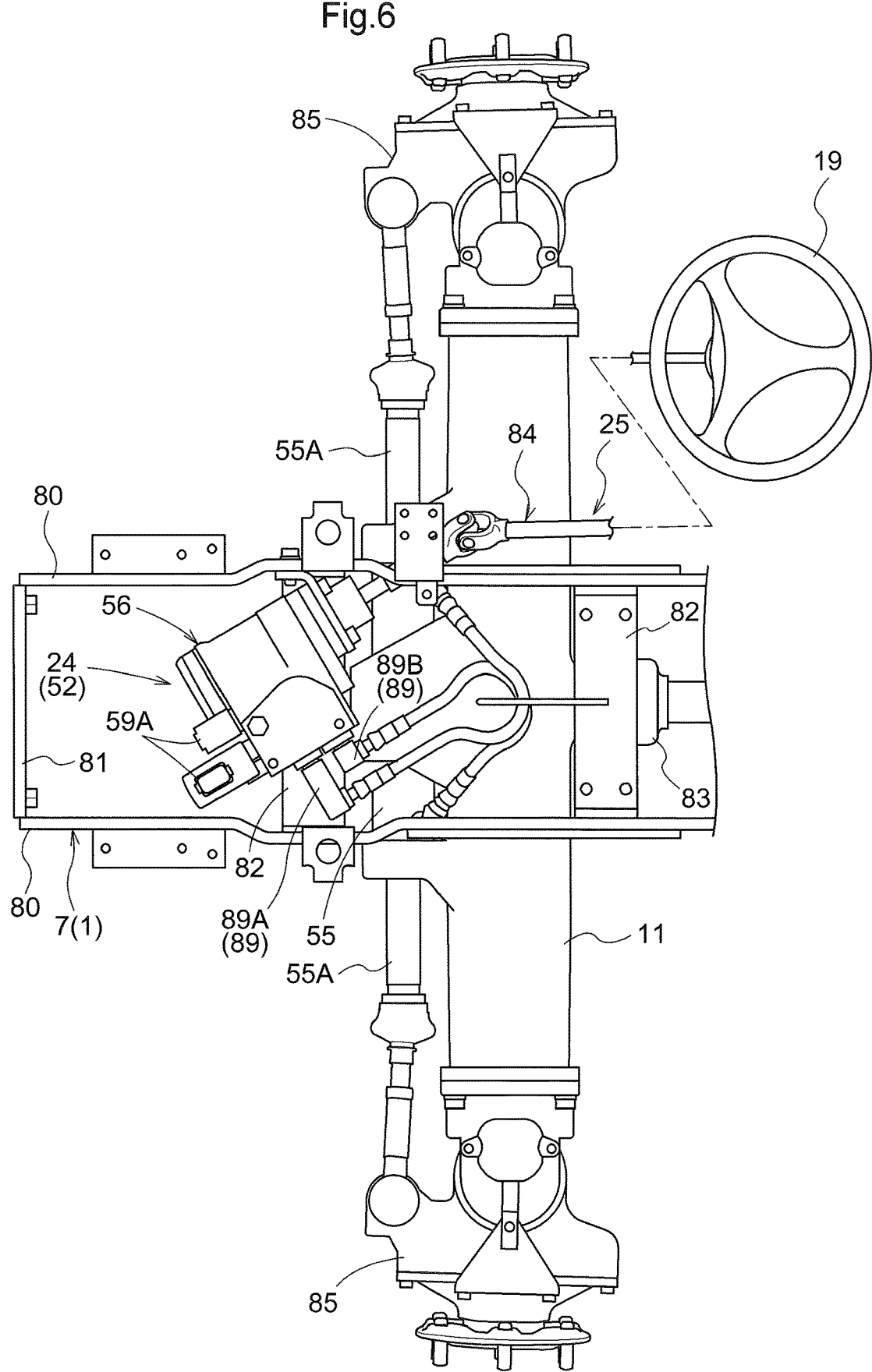
FIG. 6 is a plan view of a main part, showing the configuration and position of the power steering unit.
Figure 7:
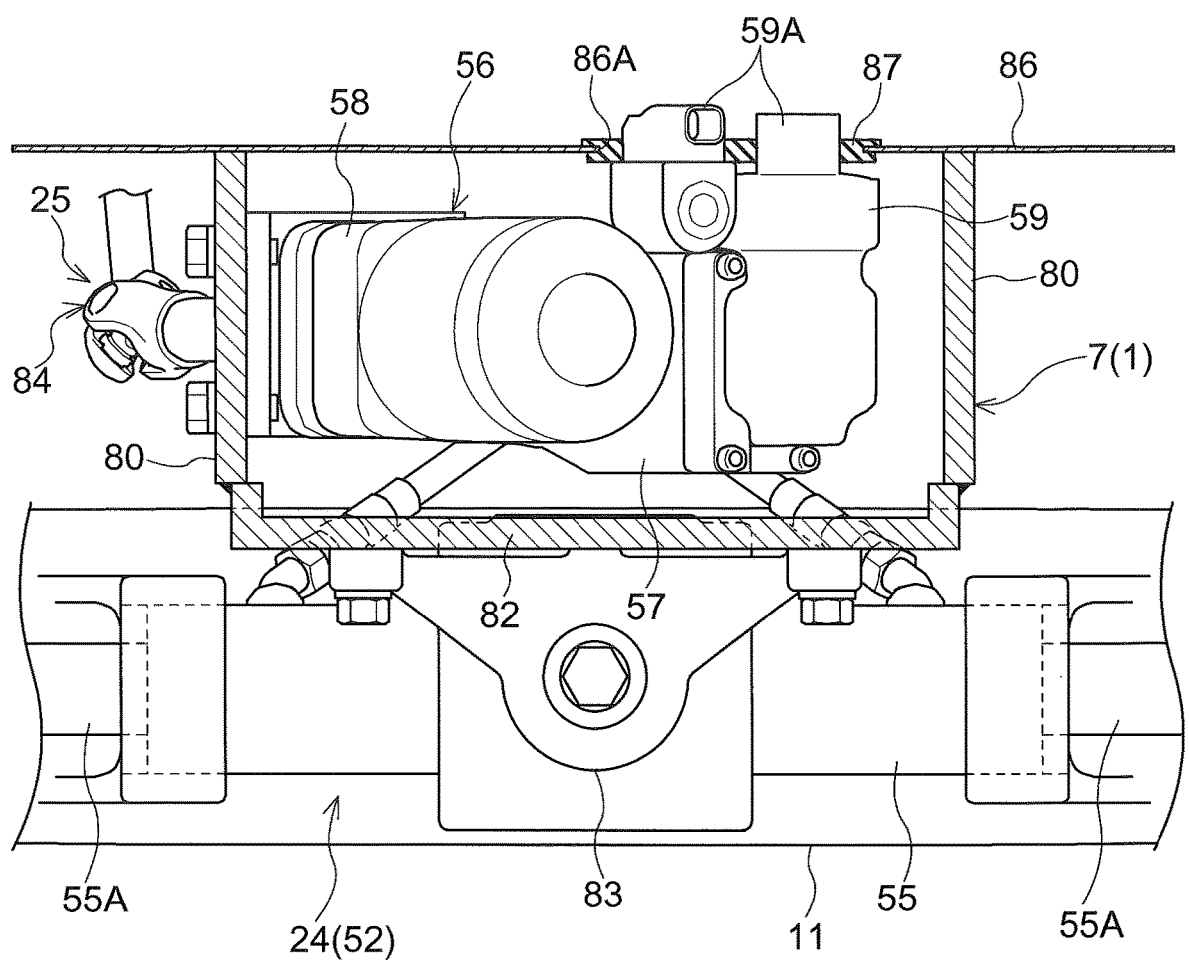
FIG. 7 is a vertical cross-sectional front view of a main part, showing the configuration and position of the power steering unit.
Figure 8:
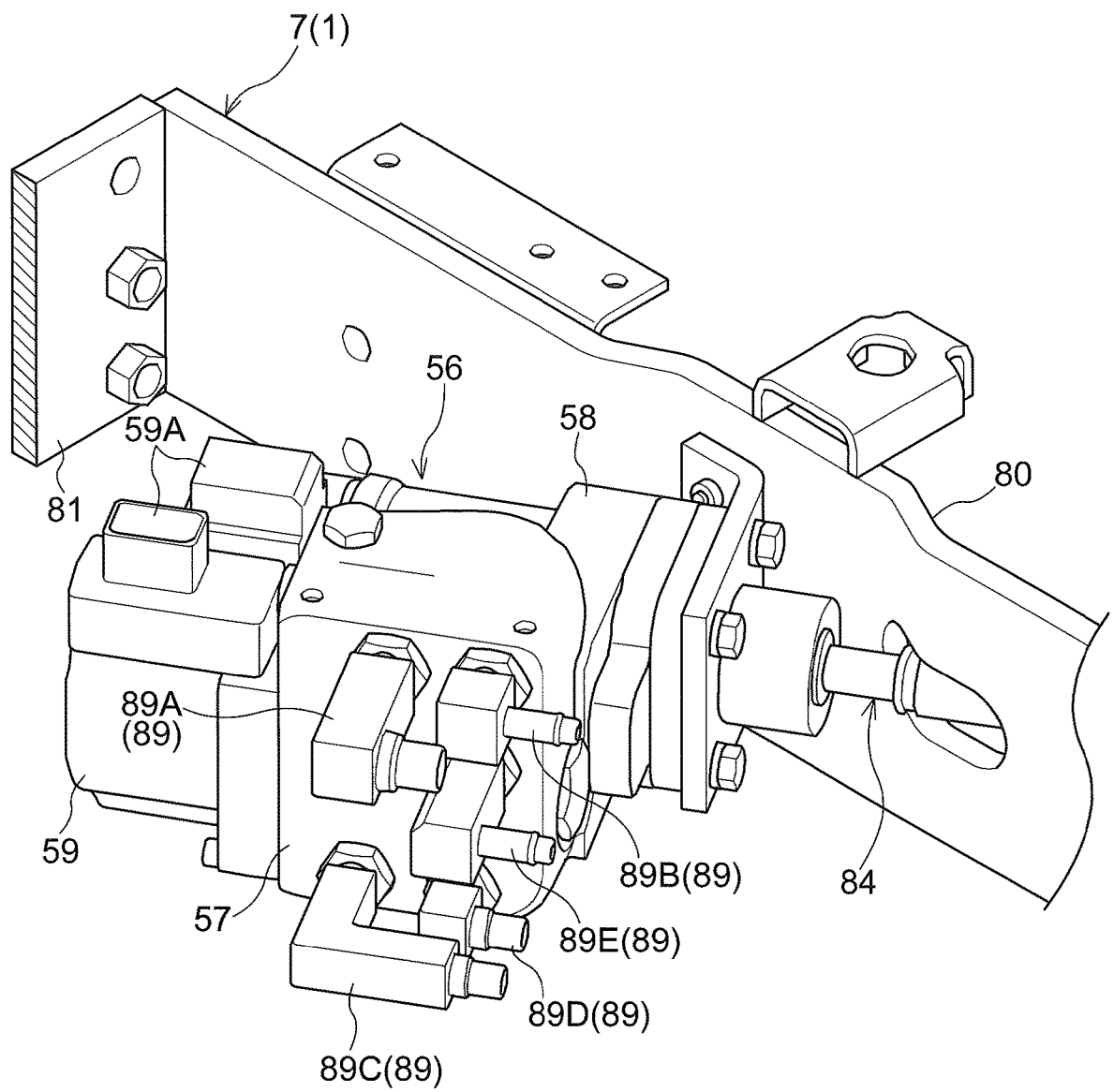
FIG. 8 is a perspective view of a main part, showing, for example, the position of an oil pressure control unit.
Figure 9:
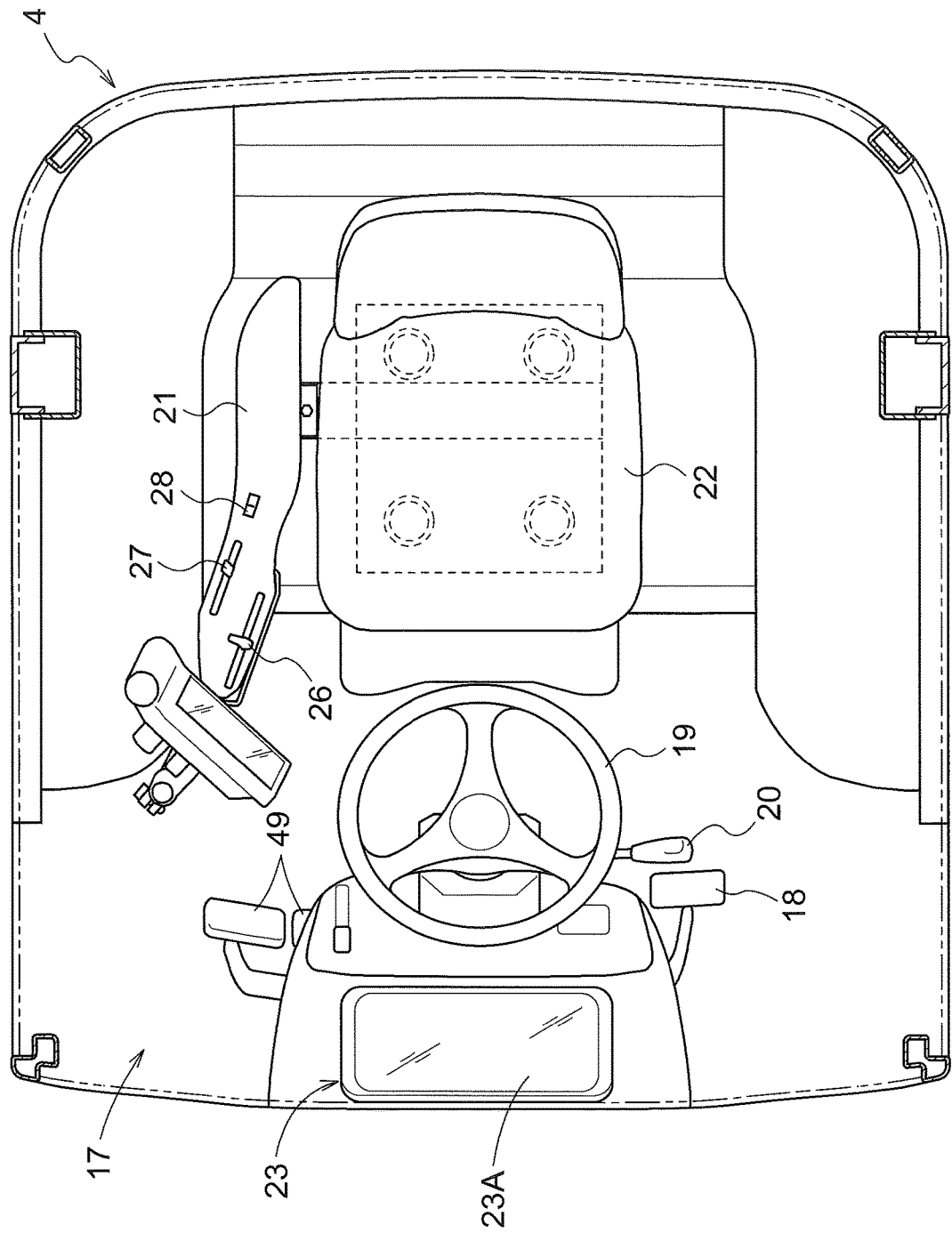
FIG. 9 is a horizontal cross-sectional plan view of a main part showing a configuration of a driver part.

As shown in FIGS. 4, 6, and 8, the oil pressure control unit 56 includes five connection ports (not shown) for hydraulic piping. Pipe fittings 89 that are each L-shaped are respectively screwed into, and thus connected to, the connection ports. A first pipe fitting 89A, a second pipe fitting 89B, a third pipe fitting 89C, and a fourth pipe fitting 89D that extend from the oil pressure control unit 56 and are connected to connection ports that are close to each other in the front-rear direction, of the pipe fittings 89, have extension lengths that are different from each other so that the second pipe fitting 89B and the fourth pipe fitting 89D on the rear side, which are adjacent to each other, are located on the inner side of the first pipe fitting 89A or the third pipe fitting 89C when they are connected to the connection ports corresponding thereto. Also, a fifth pipe fitting 89E extending from the oil pressure control unit 56, among the second pipe fitting 89B, the fourth pipe fitting 89D, and the fifth pipe fitting 89E, which are connected to connection ports that are close to each other in the top-bottom direction, has an extension length that is longer than the extension lengths of the second pipe fitting 89B and the fourth pipe fitting 89D when it is connected to the connection port corresponding thereto. The second pipe fitting 89B and the fourth pipe fitting 89D extend from the oil pressure control unit 56 and are adjacent to the fifth pipe fitting 89E at positions above and below the fifth pipe fitting 89E. Also, the fifth pipe fitting 89E has an extension length that is shorter than the extension length of the first pipe fitting 89A and the third pipe fitting 89C that extend from the oil pressure control unit 56 when it is connected to the connection port corresponding thereto.

With the above-described configuration, when the first pipe fitting 89A, the second pipe fitting 89B, the third pipe fitting 89C, the fourth pipe fitting 89D, and the fifth pipe fitting 89E are to be respectively screwed into, and thus connected to, the connection ports of the oil pressure control unit 56, the pipe fittings 89 are screwed into, and thus connected to, the connection ports corresponding thereto in ascending order of extension lengths from the oil pressure control unit 56. That is to say, the second pipe fitting 89B and the fourth pipe fitting 89D, which have the shortest extension lengths from the oil pressure control unit 56, are first screwed into, and thus connected to, the connection portions corresponding thereto, the fifth pipe fitting 89E is next screwed into, and thus connected to, the connection portion corresponding thereto, and the first pipe fitting 89A or the third pipe fitting 89C, which has the longest extension length from the oil pressure control unit 56, is screwed into, and thus connected to, the connection portion corresponding thereto. As a result, when a pipe fitting 89 that has a long extension length from the oil pressure control unit 56 is screwed into, and thus connected to, the connection portion corresponding thereto, pipe fittings 89 that have been connected are prevented from being obstructions.

As a result, even if the oil pressure control unit 56 is located in a narrow space between the left and right side members 80, the pipe fittings 89 can be efficiently screwed into, and thus connected to, the connection portions of the oil pressure control unit 56.

OTHER EMBODIMENTS

The present invention is not limited to the configuration illustrated in the embodiment above. The following illustrates other representative embodiments of the present invention.

1. The configurations illustrated below may be employed in the work vehicle.

For example, the work vehicle may have a semi-crawler type configuration that is provided with left and right crawlers instead of the left and right rear wheels 10.

For example, in the work vehicle, the left and right rear wheels 10 may be steerable wheels, or the left and right front wheels 9 and the left and right rear wheels 10 are both steerable wheels.

For example, the work vehicle may be of a two-wheel drive type in which either the left and right front wheels 9 or the left and right rear wheels 10 are driven.

For example, the work vehicle may have an electric type configuration that is provided with an electric motor instead of the engine 6.

For example, the work vehicle may have a hybrid type configuration that is provided with the engine 6 and an electric motor.

For example, the work vehicle may be provided with a protection frame instead of the cabin 4.

2. The vehicle body frame 1 may include left and right elongated side members 80 that each span between the front and rear ends of the vehicle body.

3. The wheel supporting member 11 may not be provided with the power transmission shaft 11A inside thereof.

4. The power steering unit 24 may be of an electric type provided with an assist motor. If this is the case, the assist motor may be located between the left and right side members 80.

The present invention is applicable to a work vehicle that is provided with a vehicle body frame that includes left and right side members, such as a tractor, a ridable mower, or a ridable rice transplanter.

DESCRIPTION OF REFERENCE SIGNS

9: Steerable Wheel
1: Vehicle Body Frame
11: Wheel Supporting Member
14: Radiator
16: Bonnet
19: Steering Wheel
24: Power Steering Unit
25: Steering Mechanism
51: Electronic Control System
55: Steering Cylinder
56: Oil pressure control unit
57: Steering Valve
58: First Pilot Valve
59: Second Pilot Valve
59A: Coupler
80: Side Member
86: Partition Plate
86A: Opening
87: Shielding Member
89A: First Pipe Fitting
89B: Second Pipe Fitting
89C: Third Pipe Fitting
89D: Fourth Pipe Fitting
89E: Fifth Pipe Fitting

The invention claimed is:

1. A work vehicle comprising:
    a wheel supporting member that is supported by a vehicle body frame that includes left and right side members;
    left and right steerable wheels that are supported by the wheel supporting member so as to be steerable;
    a steering mechanism that includes a power steering unit and that steers the left and right steerable wheels;
    a steering wheel for manual steering; and
    an automatic driving electronic control system for automatically driving the vehicle body,
    wherein the power steering unit is located near the wheel supporting member such that at least a portion of the power steering unit is located between the left and right side members,
    wherein the power steering unit includes a hydraulic steering cylinder that is linked to the left and right steerable wheels, and an oil pressure control unit that controls oil pressure that is applied to the steering cylinder, wherein the oil pressure control unit is supported by the vehicle body frame so as to be located between the left and right side members, and wherein the oil pressure control unit includes a pilot steering valve that controls the flow of oil to the steering cylinder, a manual first pilot valve that controls the pilot flow amount for the steering valve according to the amount of operation performed to rotate the steering wheel, and an electric second pilot valve that controls the pilot flow amount for the steering valve based on a control instruction from the electronic control system.

2. The work vehicle according to claim 1, further comprising:

a partition plate that is located so as to cover the oil pressure control unit from above;

a bonnet that provides a cooling air path between the bonnet and the upper surface of the partition plate; and a radiator that is coupled to a downstream end portion of the partition plate in a cooling direction, wherein an opening, above which a harness connection coupler included in the second pilot valve faces the opening, is formed in the partition plate, and a shielding member that blocks a gap formed between the opening and the coupler is attached to the partition plate.

3. A work vehicle comprising:

a wheel supporting member that is supported by a vehicle body frame that includes left and right side members;

left and right steerable wheels that are supported by the wheel supporting member so as to be steerable;

a steering mechanism that includes a power steering unit and that steers the left and right steerable wheels; and a plurality of pipe fittings that are L-shaped and are screwed into, and are thus connected to, a plurality of connection ports that are provided in the oil pressure control unit, wherein the power steering unit is located near the wheel supporting member such that at least a portion of the power steering unit is located between the left and right side members, wherein the power steering unit includes a hydraulic steering cylinder that is linked to the left and right steerable wheels, and an oil pressure control unit that controls oil pressure that is applied to the steering cylinder, wherein the oil pressure control unit is supported by the vehicle body frame so as to be located between the left and right side members, and wherein pipe fittings that extend from the oil pressure control unit and are connected to connection ports that are adjacent to each other, of the plurality of pipe fittings, have extension lengths that are different from each other such that one of the pipe fittings that are adjacent to each other is located on the inner side of the other pipe fitting when the pipe fittings are connected to the connection ports.

* * * * *